United States Patent [19]

Ollivier

[11] 4,257,450

[45] Mar. 24, 1981

[54] PRESSURE-REDUCING REGULATOR VALVE FOR HIGH-PRESSURE GASES

[75] Inventor: Louis A. Ollivier, Palo Alto, Calif.

[73] Assignee: Veriflo Corporation, Richmond, Calif.

[21] Appl. No.: 44,521

[22] Filed: Jun. 1, 1979

[51] Int. Cl.³ .............................................. F16K 31/12
[52] U.S. Cl. ............................... 137/505.42; 251/368
[58] Field of Search ................... 251/368; 137/505.41, 137/505.42, 505.39, 505.38

[56] References Cited

U.S. PATENT DOCUMENTS

| 473,069 | 4/1892 | Giessenbier | 137/505.41 |
| 2,082,227 | 6/1937 | Stettner | 251/368 X |
| 2,702,561 | 2/1955 | Geffroy | 137/505.42 X |
| 3,269,411 | 8/1966 | Teston | 251/368 X |

FOREIGN PATENT DOCUMENTS 22511 of 1906 United Kingdom ................ 137/505.41

*Primary Examiner*—Harold W. Weakley
*Attorney, Agent, or Firm*—Owen, Wickersham & Erickson

[57] ABSTRACT

In a pressure-reducing regulator valve for high-pressure gases, the diaphragm is linked to the movable valve member controlling the flow of gas between the high-pressure inlet and the regulated outlet. The linkage is done through a lost-motion connection so that the diaphragm can be set to deflect by a nominal amount from its relaxed position at the time that it starts to open the valve seat assembly and can be slightly deflected from its relaxed position to pull the valve against the seat of the valve seat assembly. Sealing prevents leakage through the diaphragm assembly.

10 Claims, 3 Drawing Figures

PRESSURE-REDUCING REGULATOR VALVE FOR HIGH-PRESSURE GASES

BACKGROUND OF THE INVENTION

This invention relates to an improved pressure-reducing regulator valve for high-pressure gases.

The present invention solves some significant problems.

One problem is that of providing a satisfactory pressure regulator valve for use with corrosive gases stored under high pressure in compressed gas cylinders. For example, hydrogen chloride gas, which is used for etching and other reaction in manufacture of various semiconductor items, corrodes ordinary regulators, usually made from brass and sometimes nickel-plates. Even when these regulators have been manufactured from stainless steel that satisfactorily resists direct corrosion, there have been problems in obtaining a complete shutoff of the gas flow, due to the tendency of particles to collect where they interfere with closure of the valve. These particles seem not to be traceable to corrosion within the regulator; more probably, they are either carried in the gas from the original cylinder or the particles are sucked back from beyond the valve after passage of some gas and its cutoff. At any rate, such particles have interfered between the valve and the valve seat and have prevented complete closure of the valve against its valve seat.

Another problem solved by the invention is that of obtaining reliable complete valve closure at every shutoff. Thus, the regulator valve of the present invention is also useful with such gases as arsine, carbonyl fluoride, chlorine, silicone tetrafluoride, and also with such gases as oxygen and hydrogen, if desired. When the gas is non-corrosive, the regulator may be made of any material which is suitable, such as brass or nickel-plated brass. When the material is corrosive to brass or nickel-plated brass, the basic material may be stainless steel, with certain parts made of other suitable materials.

Therefore, among the objects of the invention is that of providing a regulator capable of handling corrosive high-pressure gases and of obtaining complete shutoff when desired for both corrosive and non-corrosive gases.

Other objects of the invention include achieving these results in a structure which is readily preadjusted to desired conditions and can be preset at the factory to give a desired result, while also enabling later adjustment of other factors for existing conditions.

Another object of the invention is to provide a regulator which has basically the structure of a standard regulator with only a few changes being required. This means that it can be made by the same machining processes using the standard jigs and tools as are used in current types of regulators.

SUMMARY OF THE INVENTION

The present invention is in most ways identical to a standard type of pressure-reducing regulator. Such a regulator has a housing divided by a diaphragm assembly into a first chamber with a gas inlet and a gas outlet and a second chamber having spring means for adjusting the pressure on the diaphragm assembly. In the first chamber there is a high-pressure portion connected directly to the gas inlet and having a stationary valve seat that is coaxial with the diaphragm assembly, the valve seat having an axial opening through it. A movable valve or poppet is coaxial with the diaphragm assembly and with this axial opening, and is spring urged toward this seat to close that axial opening, but also is urged by the diaphragm away from the seat to emit gas from the high-pressure portion into a low-pressure portion of the first chamber. This low-pressure portion is connected to the gas outlet and has one end closed by the diaphragm assembly.

In combination with this known device, the present invention provides an axial member mounted to the diaphragm assembly along its axis for limited lost motion, axially with respect to the diaphragm assembly. A nose portion of the movable valve extends through its axial opening and is secured rigidly to this axial member. Sealing means prevents leakage through the diaphragm assembly around this axial member.

More specifically, a standard regulator of the type with which this invention is associated, typically has two housing members clamping between them a diaphragm assembly that seals off two chambers, one on each side of the diaphragm assembly. The diaphragm proper is metal, is clamped at the peripheral edge, and has a central, axially-extending recess. In the second housing is a diaphragm plate which bears against and supports the diaphragm, and this diaphragm plate has a central interiorly-threaded nut portion in line with the central diaphragm opening. On the opposite side of the diaphragm is a diaphragm screw having an enlarged head and which is threaded into the nut portion of the plate so as to clamp the diaphragm between the diaphragm plate and the diaphragm screw. The valve seat assembly is secured and sealed in an axially-extending recess of the first housing member and has an axially-extending passageway therethrough into which the gas inlet leads at a location distant from the diaphragm assembly. An annular valve seat surrounds an axial valve opening at the opposite end of this valve seat assembly, and, inside the valve seat assembly, is a movable valve member or poppet. This valve member has a valve seating portion that can close against the valve opening, and a light spring urges the valve member toward the valve seat. On the opposite side of the diaphragm, there is usually a coil spring with one end bearing against the diaphragm plate and the other end carrying a spring button. A pressure-adjusting screw bears against the spring button and is threaded through a central axial opening of the housing member, extending outside the housing and having a handle there.

In the present invention, the diaphragm screw is a hollow screw with an axial passage through it. This axial passage has a first wide portion that faces the valve opening and a second wide portion at its opposite end; a narrow portion in-between these two wide portions is joined to them by respective shoulders. This hollow screw also has an annular end portion that extends beyond the nut portion of the diaphragm plate.

Inside the axial passage through the hollow screw is a solid screw. The solid screw has a head joined to a wide stem portion which is retained in the first wide portion. This stem portion is joined by a shoulder to a narrow threaded stem portion extending through the passage's narrow portion and into the second wide portion. An interiorly-threaded sleeve nut lies wholly within the second wide portion and is threaded around the narrow stem portion of the solid screw. This sleeve nut has an end wall that is adapted to bear against the shoulder joining the narrow passage portion to the second wide portion, while the shoulder on the wide stem portion is adapted to bear against the shoulder joining the narrow passage portion to the first wide portion. The distance between the shoulder of the solid screw and the end wall of the sleeve nut is such that there is a lost-motion connection. In other words, that distance is greater than the length of the narrow portion between its two shoulders.

Sealing is secured as by using a closed-end cap threaded on the nut portion of the diaphragm plate, the cap having a gasket, usually of material that can withstand corrosive action, such as a fluoropolymer. This cap and gasket seal the passage through the hollow screw and prevent gas leakage from one side of the diaphragm to the other.

Finally, the present invention calls for the movable valve member to have an axial nose portion that extends through the valve opening and is threaded to the solid screw. As a result, the diaphragm, allowing for a predetermined amount of lost motion, actually is able to pull the valve seat forcibly into its closed position, as well as to push it away from that closed position, as is normal with such valves. This positive closing action, is a major feature of the present invention.

All the parts may be made of stainless steel, but preferably the movable valve is made from monel metal and the gasket is made from the fluoropolymer, as already stated. This enables use with corrosive gases; where corrosive gases are not to be used with the regulator, other materials may be used.

Other objects and advantages of the invention will appear from the following description of a preferred embodiment.

DESCRIPTION OF A PREFERRED EMBODIMENT

Figure 1:
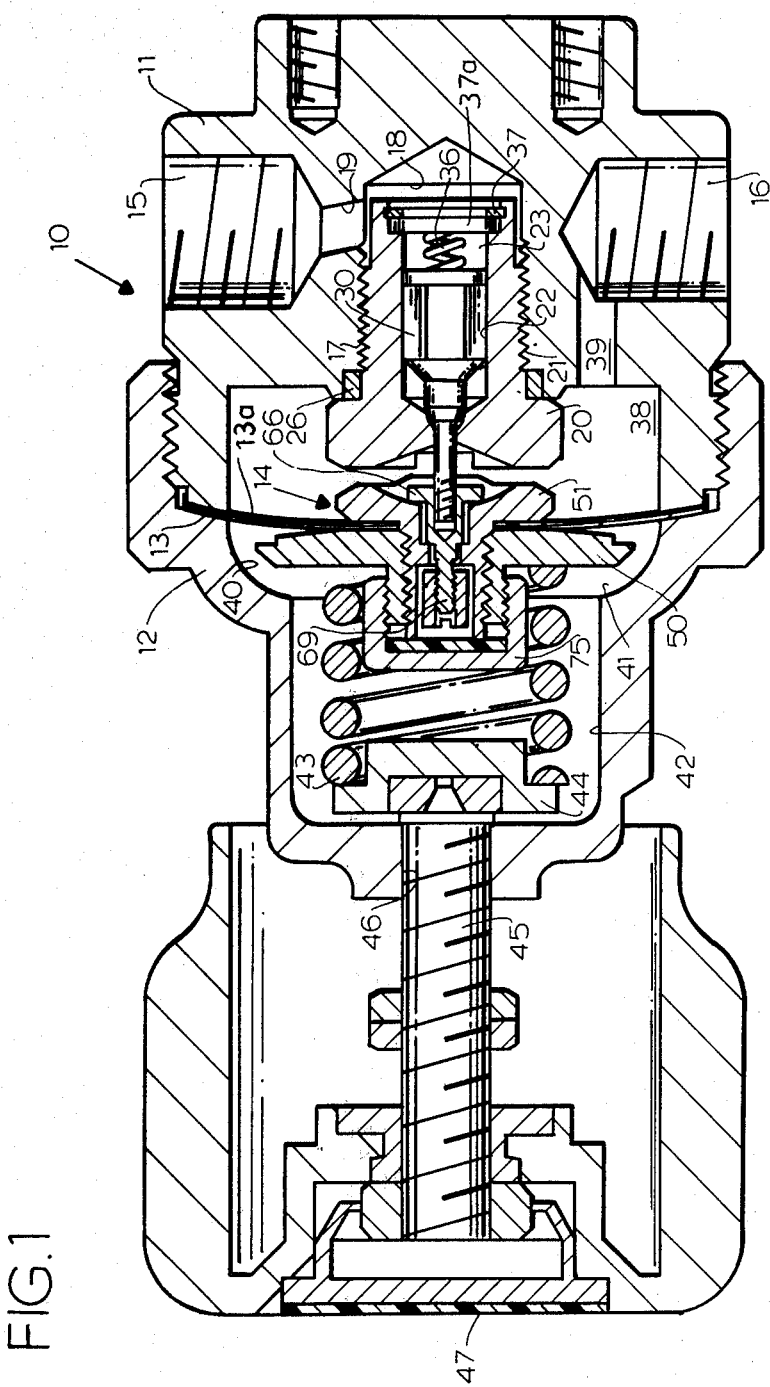
FIG. 1 is a view in elevation and in section of a regulator embodying the principles of the invention.
Figure 2:
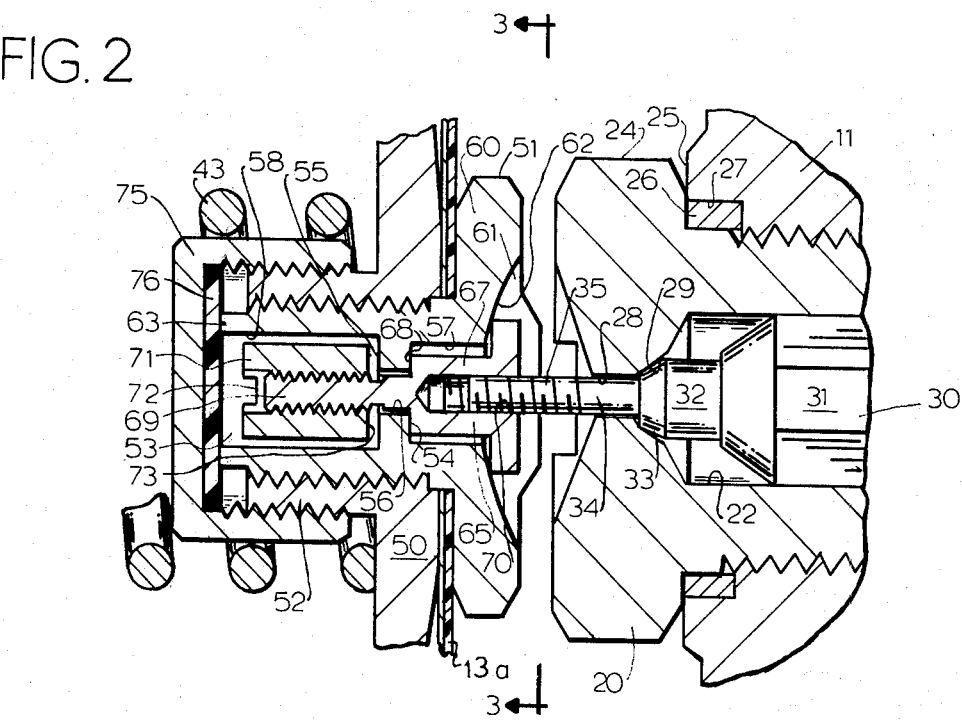
FIG. 2 is an enlarged view of a portion of FIG. 1.
Figure 3:
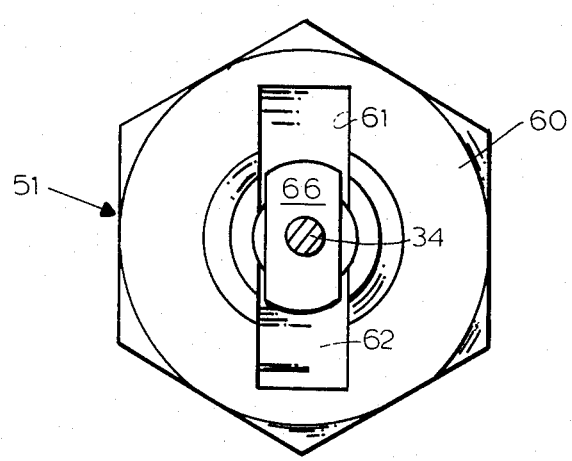
FIG. 3 is a view taken along the line 3—3 in FIG. 2.

A regulator 10 embodying the invention may, as shown in the drawings, comprise first and second housing members 11 and 12, which are threaded together and clamp between them a diaphragm 13 and a fluoropolymer liner 13a (for sealing and corrosion protection), forming part of a diaphragm assembly 14.

The first housing member 11 is provided with a gas-inlet opening 15 in which may be attached a suitable threaded fitting for attachment to a compressed gas cylinder. It is also provided with a gas outlet opening 16 which is preferably threaded for attachment of a suitable fitting to conduct the gas after pressure reduction and regulation to a desired tool or fitting. The housing 11 provides an axially-extending recess 17, preferably interiorly threaded, and connected at its distal end 18 to a passageway 19 leading from the inlet opening 15.

In the opening is threaded a hollow valve seat assembly 20, preferably made of monel metal, which is provided with a screw-threaded exterior wall 21 and a smooth interior wall 22 defining an interior passage 23. The interior portion is open at one end so that the inlet gas under high pressure can flow from the passageway 19 into the interior passage 23. At the opposite end of the seat assembly 20, facing the diaphragm assembly 14, is an enlarged head 24 which bears on an annular rib 25 of the housing 11 and on a gasket 26 in a recess 27 of the housing 11, to assure a seal there. Through the head 24 is an axial opening 28 and a seat. On the interior of the seat member 20 is a valve, which is preferably frustoconical.

Within the passage 22 is a movable valve member or poppet 30, having a body portion 31, which may be made of stainless steel, e.g., 316. The body portion 31, which helps to retain accurate alignment in the passage 22, carries a fluoropolymer annular frustoconical valve 32 with a seating portion 33 that engages the valve 30 to close off the opening 28. A novel feature of this poppet 30 is a forwardly-extending stem or nose 34 which extends from the body portion 31 and out through the opening 28 and has a threaded outer end 35. Its purpose will be discussed below. The rear end of the valve body 31 is in engagement with a spring 36, held in the member 20 by a filter screen 37a and a retaining washer 37, so that the valve 30 is spring-urged toward a position closing the valve seating portion 33 against the seat 29. The valve opening 28 leads into a recess 38 in the housing 11, which, in conjunction with the diaphragm assembly 14, defines a cavity, and this cavity is joined by a suitable passageway 39 to the gas outlet opening 16.

The housing member 12 provides a recess 40 having a wider portion 41 for the diaphragm assembly 14 and a somewhat narrower portion 42 to receive a coil spring 43 which bears upon the diaphragm assembly 14 at one end. A spring button 44 is seated in the opposite end of the spring 43 and bearing against it is a threaded adjusting screw 45 which extends out through a threaded opening 46 through the housing 12 and has a suitable handle 47 attached to it so that adjustments in pressure can be made.

The diaphragm assembly 14 comprises in addition to the diaphragm itself a diaphragm plate 50 and a diaphragm screw 51, both of which are hexagonal in shape, which are threaded together, the screw 51 being exteriorly threaded and the diaphragm plate 50 having a rearwardly-extending cylindrical nut portion 52 which is interiorly and exteriorly threaded. Thus, the diaphragm plate 50 and the diaphragm screw 51 clamp the diaphragm 13 between them. The diaphragm plate 50 backs up the diaphragm 13, supports it, and prevents damage to it.

The diaphragm screw 51 is, in this particular invention, unusual inasmuch as it is a hollow screw having an axial passage 53 through it. The passage 53 has a first wide portion 57 at the end facing the valve opening 28, a second wide portion 58 on the opposite end, and in-between them, a narrow portion 56 having a first shoulder 54 on the valve-opening side and a second shoulder 55 on the opposite side. The hollow screw 51 also has a head 60 portion that bears against the diaphragm 13 and preferably has a rectangular recess 61, preferably dished into the head 60 to give a curved bottom 62. On the opposite end of the hollow screw 51 is an annular end wal 63 that extends beyond the nut portion 52 of the diaphragm plate 50.

A very important element of this invention is a poppet extension 65, which is a solid screw that is provided with a rectangular head 66 which fits in the rectangular recess 61 and thereby is keyed so that threading in the screw 65 does not affect its rotational position relative to the diaphragm assembly 14. This poppet extension 65 has, next to the head 66, a wide stem portion 67 which is joined by a shoulder 68 to a narrow stem portion 69. The wide stem portion 67 is sufficiently wide so that the shoulder 68 will engage the first shoulder 54 of the passage 53 in one position. The outer portion of the narrow portion 69 is threaded. The poppet extension 65 also has an interiorly threaded receptacle 70 into which the threaded nose portion 35 of the valve poppet 30 is threaded.

A sleeve nut 71 is interiorly threaded and fits around the threaded portion of the narrow stem portion 69. The nut 71 is provided with a keyed portion 72 at its outer end. it also has an end wall 73 at its opposite end, which is larger in diameter than the narrow passage portion 56, so that the end wall 73 can abut the second shoulder 55. In use, the end wall 73 is at all times spaced from the shoulder 68 of the poppet extension 65 by a longer distance than the length of the narrow portion 56 of the passage 53, so that the two shoulders 54 and 55 of that passage 53 are always closer to each other than are the end wall 73 and the shoulder 68. The purpose is to provide lost motion, as will be explained further below.

A solid cap 75 is threaded to the exterior threading of the nut portion 52 of the diaphragm plate 50 and carries in it a gasket 76, preferably of fluoropolymer, such as Kel-F. When the cap 75 tightens the gasket 76 against the end seat 63 of the solid screw 65, no leakage through the diaphragm assembly 14 can occur, even though fluid can pass around the screw 65 and sleeve nut 71.

It will now be appreciated that the poppet 30 is always linked to the diaphragm assembly 14 with a single in-line connection.

Assembly of the parts may begin by inserting the poppet 30 and the spring 36 with its filter 37a and retaining washer 37 into the valve seat assembly 20 and screwing the valve seat assembly 20 into the recess 17 of the housing 11. The diaphragm assembly 14 is prepared by sandwiching the diaphragm 13 and liner 13a between the plate 50 and the hollow screw 51 and threading the screw 51 into the nut portion 52 of the plate 50. The poppet extension 65 is threaded to the valve nose 34 and is then inserted into the passageway 53 through the diaphragm screw 51. The rectangular head 66 is aligned with and inserted into the rectangular recess 61 and the wrench on the diaphragm plate. The diaphragm assembly 14 is rotated, using a wrench on the exterior hexagonal portion of the diaphragm plate 50 until there is a nominal deflection of 0.010" from its natural (relaxed) position and until the shoulders 54 and 68 are abutted. The rotation of the poppet extension 65 moves it axially, since the valve nose 34 is prevented from rotating by the friction created by the spring loading of the poppet 30 against the seat 29. A suitable sealant is applied to the threads of the portion 69 of the poppet extension 65, and the sleeve nut 71 is then threaded around the portion 69. The sleeve nut 71 is turned until its end wall 73 abuts against the shoulder 55, and then is unscrewed counterclockwise about one-quarter of a turn.

A sealant is then applied to the exterior threads of the nut 52, and the sealing cap 75, with the gasket 76 already inserted into it, is tightened into place against the end wall 63 of the diaphragm screw 51. The diaphragm plate 50 is held by a wrench while tightening the cap 75 into place, so that the adjustment obtained for the position of the diaphragm is not disturbed. The spring 43 is placed around the cap 75, its button 44 emplaced, and the screw 45 threaded into the housing 12. The assembly is then completed in the normal manner by screwing the housing members 11 and 12 together to clamp the diaphragm assembly 14 in place.

For removal of the valve 30 and the valve seat assembly 20, the sealing cap 75 is first unscrewed while holding the hexagonal diaphragm plate 50 with a wrench. The threaded sleeve nut 71 is then unscrewed from the poppet extension 65, so that the diaphragm assembly 14 can be removed. Then the valve seat assembly 20 can be removed from the recess 17.

In normal operation, the diaphragm assembly 14 functions in the same manner as in the normal pressure regulator. When the outlet pressure decreases below the setting, movement of the diaphragm assembly 14 brings the first shoulder 54 into contact with the shoulder 68 of the poppet extension 65 and therefore moves the seating portion 33 of the valve 30 away from the seat 29. As the outlet pressure rises to the pressure to which the regulator 10 has been set by the adjusting screw 45, the diaphragm assembly 14 moves the shoulder 54 away from the shoulder 68 of the poppet extension 65, so that the valve 30 seals against its seat 29 under the action of the poppet spring 36 and the supply pressure of the gas. If the outlet pressure continues to increase beyond the predetermined setting, the diaphragm assembly 14 will then move to bring the second shoulder 55 against the end wall 73 of the sleeve nut 71 and further movement of the diaphragm assembly 14 will then pull the valve 30 against its seat 29.

The poppet extension 65 is strong enough to transmit several hundred pounds of force even to the point of molding the fluoropolymer seat 76 against the area of the seat.

It will be seen that the invention provides an adjustable zone between the two points of actuation of the diaphragm assembly 14, namely, the point at which the diaphragm assembly 14 starts to push the valve 30 away from its seat 29 in the valve seat assembly 20 and the point at which the diaphragm assembly 14 starts to pull the valve 30 against its seat 29 in the valve seat assembly 20. This adjustable zone is provided by the lost-motion connection due to the spacing apart of the shoulder 68 and end wall 73 being greater than the spacing between the two shoulders 54 and 55. As shown, to obtain the desired amount of lost motion, the diaphragm assembly 14 is adjusted so that it deflects by a predetermined nominal amount from its relaxed position when the shoulder 68 engages the shoulder 54 and starts to open the valve seat assembly. At the other end, the sleeve nut 71 is adjusted so that the diaphragm assembly 14 is slightly deflected from its relaxed position when the end wall 73 engages the shoulder 55 to pull the valve 30 against the seat 29 of the valve seat assembly 20.

As indicated above, this invention makes it possible to hold the diaphragm assembly 14 in its adjusted operating position while tightening the sealing cap 75 to the diaphragm assembly 14, and this is an important feature, too.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pressure-reducing regulator for high-pressure gas, having a housing divided by a diaphragm assembly into a first chamber with a gas inlet and a gas outlet and a second chamber having a first spring for adjusting the pressure on said diaphragm assembly, said first chamber having a high-pressure portion connected directly to said gas inlet with a stationary valve seat coaxial with said diaphragm assembly and having an axial opening therethrough, and a movable valve coaxial with said diaphragm assembly and urged by a second spring toward said seat to close said axial opening and urged by said diaphragm away from said seat to admit gas from said high-pressure portion into a low-pressure portion of said first chamber connected to said gas outlet and having one end closed by said diaphragm assembly, the improvement of having in combination therewith:

an axial member loosely mounted to said diaphragm assembly along its axis by means providing limited lost axial motion with respect to said diaphragm assembly during operation of said regulator, a nose portion of said valve extending through said axial opening through said seat and secured rigidly to said axial member, and sealing means for preventing leakage through said diaphragm assembly around said axial member, so that upon movement of said diaphragm enlarging said first chamber, said second spring causes said movable valve and axial member to move with said diaphragm assembly and substantially close said movable valve against its seat, further movement of said diaphragm assembly eventually leading to pulling said movable valve more tightly against its seat and upon movement thereafter of said diaphragm to diminish said first chamber it at first does not cause movement of said movable valve and then upon exceeding the limit of the lost motion pushes said movable valve open against the pressure of said second spring.

2. The regulator of claim 1 having means for adjusting the magnitude of said lost motion.

3. The regulator of claim 1 having means for adjusting securement of said nose member to said axial member so as to vary the distance between them.

4. The regulator of claim 1 wherein said sealing means is independent of the position of the diaphragm assembly relative to other members of the regulator.

5. The regulator of claim 1 for use with corrosive gases, wherein said housing, said diaphragm assembly, the metal portion of said valve, and said axial member are made from stainless steel, said valve seat is made from monel metal, and the non-metal portion of said valve and said seal from fluoropolymer.

6. A pressure-reducing regulator for high-pressure gas, having a housing divided by a diaphragm assembly into a first chamber with a gas inlet and a gas outlet and a second chamber and having spring means for adjusting the pressure on said diaphragm assembly, said first chamber having a high-pressure portion connected directly to said gas inlet with a stationary valve seat coaxial with said diaphragm assembly and having an axial opening therethrough, and a movable valve coaxial with said diaphragm assembly and spring urged toward said seat to close said axial opening and urged by said diaphragm away from said seat to admit gas from said high-pressure portion into a low-pressure portion of said first chamber connected to said gas outlet and having one end closed by said diaphragm assembly, the improvement of having in combination therewith:

an axial passage through said diaphragm assembly having two wide portions separated by a narrow portion having a shoulder at each end, an axial screw mounted loosely in said axial passage and having a shoulder for engagement of one shoulder of said narrow portion and a narrow threaded portion, an axial sleeve nut threaded to said narrow threaded portion and having an end wall for engagement of the other shoulder of said narrow portion, said shoulder of said screw and said end wall being spaced apart farther than the length of said narrow portion to provide limited lost motion of said screw and sleeve with respect to said diaphragm assembly, a nose portion of said valve extending through said axial opening through said seat and threaded to said screw, and sealing means for preventing leakage through said diaphragm assembly around said screw and sleeve.

7. The regulator of claim 6 for use with corrosive gases wherein all metal parts except said valve seat is made from stainless steel, said valve seat being made from monel metal, and all the non-metal parts, including those of said valve and said sealing means, are made of fluoropolymers.

8. The regulator of claim 6 including means for retaining said axial screw against rotation relative to said diaphragm assembly.

9. A pressure-reducing regulator for gas under high pressure of the type having:

a first housing member with a gas inlet, a gas outlet, and an axially extending recess connected to said gas inlet, a second housing member with an opening therethrough to atmosphere, threadedly secured to said first housing member, a diaphragm assembly, including a metal diaphragm clamped at its peripheral edge between said first and second housing members and sealing them off from each other and axially aligned with said axially extending recess, said diaphragm having a central axial opening therethrough, a diaphragm plate in said second housing backing up most of said diaphragm and having a central interiorly threaded nut portion in line with said central diaphragm opening, and a diaphragm screw with an enlarged head on the opposite side of said diaphragm from said plate facing and axially aligned with said axially extending recess, threaded into said nut portion's interior threads, with said head bearing on said diaphragm and clamping it to said diaphragm plate, a valve seat assembly secured and sealed in said axially extending recess of said first housing member and having an axially extending passageway therethrough into which said gas inlet leads at a first end distant from said diaphragm assembly and having an annular valve seat around an axial valve opening at a second end facing said diaphragm assembly, a valve member movable inside said valve seat assembly and having a valve seating portion for seating against said valve seat to close said valve opening, light spring means between said first housing member and said valve member urging said valve member toward said valve seat, spring means in said second housing bearing against said diaphragm plate at one end, and pressure-adjusting means bearing against said spring means, the combination therewith of:

a passage extending axially through said diaphragm screw and having a first wide portion facing said axially extending recess, a second wide portion facing said axial threaded opening of said second housing member, and a narrow portion in between said first and second wide portions joined to them by first and second shoulders, respectively, said screw having an annular end seat portion extending beyond said nut portion, a solid screw inside said passage having a head joined to a wide stem portion in said first wide portion which is joined by a third shoulder to a narrow, threaded stem portion, the third shoulder being adapted to bear against said first shoulder at one extreme axial position of said solid screw relative to said diaphragm assembly, an interiorly threaded sleeve nut lying wholly within said second wide portion and threaded around said narrow stem portion, having an end wall adapted to bear against said second shoulder at another extreme axial position of said solid screw relative to said diaphragm assembly, said end wall and said third shoulder being appreciably farther apart from each other than the length of said narrow portion of said passage through said diaphragm screw, to provide lost motion between the engagement of said third shoulder with said first shoulder and the engagement of said end wall with said second shoulder, sealing means secured to said nut portion of said diaphragm plate and engaging said annular end seat portion of said diaphragm screw, to seal said passage through said diaphragm screw and prevent gas leakage from one side of said diaphragm to the other, said valve member having an axial nose portion threaded to said solid screw.

10. A pressure-reducing regulator for gas under high pressure, including in combination:

a first housing member having a gas inlet, a gas outlet, and an axially extending recess connected to said gas inlet, a second housing member having an opening therethrough to atmosphere, threadedly secured to said first housing member and having a central axial threaded opening at an end distant from said first housing member, a diaphragm assembly, including a metal diaphragm clamped at its peripheral edge between said first and second housing members and sealing them off from each other and axially aligned with said axially extending recess and said axial threaded opening, said diaphragm having a central axial opening therethrough, a diaphragm plate in said second housing backing up most of said diaphragm and having a central, interiorly and exteriorly threaded axial nut portion in line with said central diaphragm opening, and a hollow screw on the opposite side of said diaphragm from said plate, threaded into said nut portion's interior threads, with a head bearing on said diaphragm and clamping it to said plate and a passage extending axially through said hollow screw and having a first wide portion facing said axially extending recess, a second wide portion facing said axial threaded opening of said second housing member, and a narrow portion in between said first and second wide portions joined to them by first and second shoulders, respectively, said screw having an annular end seat portion extending beyond said nut portion.

a solid screw inside the passage through said hollow screw, having a head joined to a wide stem portion in said first wide portion, which is joined by a third shoulder to a narrow stem portion, the third shoulder bearing against said first shoulder at one extreme axial position of said solid screw relative to said diaphragm asembly.

an interiorly threades sleeve lying wholly within said second wide portion and threaded to said narrow stem portion and having an end wall bearing against said second shoulder at another extreme axial position of said solid screw relative to said diaphragm assembly, said end wall and said third shoulder being appreciably farther apart from each other than the length of said narrow portion of said passage through said hollow screw, to provide lost motion between the engagement of said third shoulder with said first shoulder and engagement of said end wall with said second shoulder, a closed end cap threaded on the exterior threading of said nut portion of said diaphragm plate and having a gasket in engagement with said annular end seat portion of said hollow screw, to seal said passage through said hollow screw and prevent gas leakage from one side of said diaphragm to the other, a coil spring in said second housing bearing against said diaphragm plate at one end, a spring button bearing against the other end of said coil spring, a pressure-adjusting screw bearing against said spring button and threaded through said central axial opening of said second housing member, a handle secured to the end of said screw outside said second housing member, a valve seat assembly secured and sealed in said axially extending recess of said first housing member and having an axially extending passageway therethrough into which said gas inlet leads at a first end distant from said diaphragm and having an annular valve seat around an axial valve opening at a second end facing said diaphragm, a valve member movable inside said valve seat assembly and having a valve seating portion for seating against said valve seat to close said valve opening, said valve member having an axial nose portion threaded to said solid screw, and light spring means between said first housing member and said valve member urging said valve member toward said valve seat.

* * * * *